(12) United States Patent
Jeon

(10) Patent No.: US 10,422,398 B2
(45) Date of Patent: Sep. 24, 2019

(54) APPARATUS FOR DAMPING VIBRATION

(71) Applicant: KOREA ADVANCED INSTITUTE OF SCIENCE AND TECHNOLOGY, Daejeon (KR)

(72) Inventor: Wonju Jeon, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 72 days.

(21) Appl. No.: 15/638,177

(22) Filed: Jun. 29, 2017

(65) Prior Publication Data
US 2018/0187734 A1    Jul. 5, 2018

(30) Foreign Application Priority Data

Dec. 30, 2016 (KR) .......................... 10-2016-0184277

(51) Int. Cl.
F16F 1/04 (2006.01)
F16F 15/08 (2006.01)

(52) U.S. Cl.
CPC .............. F16F 1/043 (2013.01); F16F 1/041 (2013.01); F16F 15/08 (2013.01)

(58) Field of Classification Search
CPC ............ F16F 1/043; F16F 1/041; F16F 15/08
USPC ................... 188/379, 380; 267/229, 361, 41
See application file for complete search history.

(56) References Cited

U.S. PATENT DOCUMENTS

| 1,895,948 | A | * | 1/1933 | Van Den Broek | F16F 1/041 267/156 |
| 4,232,762 | A | * | 11/1980 | Bschorr | F16L 55/0336 138/26 |
| 5,665,648 | A | * | 9/1997 | Little | H01L 23/485 257/E21.508 |
| 6,245,444 | B1 | * | 6/2001 | Marcus | G01R 1/06733 267/156 |
| 7,707,714 | B2 | * | 5/2010 | Schmidt | H01F 17/0006 29/605 |
| 2010/0090471 | A1 | * | 4/2010 | Casero Fernandez-Montes | B29C 70/44 290/55 |
| 2014/0027965 | A1 | * | 1/2014 | Holloway | F16F 3/04 267/156 |

FOREIGN PATENT DOCUMENTS

JP   2010-144868 A   7/2010
JP   2011-241935 A   12/2011
(Continued)

OTHER PUBLICATIONS

Jeon, Wonju "Vibration damping using a spiral acoustic black hole Hamburg 2016" Internoise 2016 Conference, Hamburg, Germany, Aug. 22, 2016, pp. 2387-2391.
(Continued)

Primary Examiner — Thomas W Irvin
(74) Attorney, Agent, or Firm — Womble Bond Dickinson (US) LLP

(57) ABSTRACT

A vibration damping apparatus according to an exemplary embodiment of the present invention includes a main body extended from one side of a vibrating structure with a predetermined length from one end that contacts the structure to the other end, wherein at least a part of the main body is bent with a gradually decreasing thickness.

15 Claims, 12 Drawing Sheets

(56) References Cited

FOREIGN PATENT DOCUMENTS

| JP | 5238855 B2 | 7/2013 |
| JP | 5403157 B2 | 1/2014 |

OTHER PUBLICATIONS

Jeon, Wonju "Waves in Fluids, Solids and Metamaterials" The Korean Society of Mechanical Engineers (KSME) 2016 Conference, Kangwon-do, Korea, Dec. 15, 2016, p. 129.

* cited by examiner

APPARATUS FOR DAMPING VIBRATION

CROSS-REFERENCE TO RELATED APPLICATION

This application claims priority to and the benefit of Korean Patent Application No. 10-2016-0184277 filed in the Korean Intellectual Property Office on Dec. 30, 2016, the entire contents of which are incorporated herein by reference.

BACKGROUND OF THE INVENTION

(a) Field of the Invention

The present invention relates to a vibration damping apparatus. More particularly, the present invention relates to an apparatus that is provided in one side of a structure to dampen vibration generated from the structure.

(b) Description of the Related Art

Effective damping of vibration in a thin plate or beam structure is a major consideration in design and analysis of various machine systems. In many industry fields, a surface of the plane or beam structure is treated with a thin damping material to dampen vibration. However, a conventional method for damping the vibration by attaching the damping material to the surface of the structure may be an inefficient vibration damping method depending on a shape or size of the structure. In order to dampen vibration in a large plate, a large amount of damping material relative to the weight of the structure needs to be attached to the surface of the structure for effective vibration control of the structure. Accordingly, in industry fields where the weight of a system is important, such as a transport industry, a more effective vibration damping method than the existing surface treatment method is required.

The above information disclosed in this Background section is only for enhancement of understanding of the background of the invention, and therefore it may contain information that does not form the prior art that is already known in this country to a person of ordinary skill in the art.

SUMMARY OF THE INVENTION

One aspect of the present invention has been made in an effort to provide a vibration damping apparatus that can effectively dampen vibration and noise of a structure using a small space.

A vibration damping apparatus according to an exemplary embodiment of the present invention includes a main body extended from one side of a vibrating structure with a predetermined length from one end that contacts the structure to the other end, wherein at least a part of the main body is bent with a gradually decreasing thickness.

The at least a part of the main body may be bent with a constant curvature.

The at least a part of the main body may be bent with a constant curvature with respect to an axis that is parallel with a plane of the one end of the main body, contacting the structure.

A cross-section of the at least a part of the main body, cut along a plane that is perpendicular to the axis, may have an arc shape.

The at least a part of the main body may be bent with a varying curvature.

The at least a part of the main body may be bent with a varying curvature with respect to an axis that is parallel with a plane of the one end of the main body, contacting the structure.

The at least a part of the main body may be bent with a curvature that is gradually increased while being extended in a direction of the other end of the main body.

A cross-section of the at least a part of the main body, cut into a plane that is perpendicular to the axis, may have a spiral shape.

The spiral shape may be an Archimedean spiral.

A line along which one side of the main body is extended may be formed of the Archimedean spiral in the cross-section of the at least a part of the main body.

The main body may be extended from the edge plane of the structure, and the one end of the main body may have the same thickness as the edge plane.

The main body may be extended integrally with the structure throughout the edge plane of the structure.

The other end of the main body may be disposed apart from the structure.

The vibration damping apparatus according to the exemplary embodiment of the present invention may further include a damping material attached to the at least a part of the main body.

The damping material may be attached to the other end of the main body.

The main body has a thickness that is gradually decreased from the one end to the other end as given in an equation of $h(x)=h_0+\varepsilon x^m$, $m \geq 2$, wherein $h(x)$ denotes a thickness of the main body, m denotes a positive real number, $\varepsilon$ denotes a positive real number, x denotes a distance from the other end of the main body, and $h_0$ denotes a thickness of the main body at the other end.

The main body may be made of the same material as the structure.

According to the exemplary embodiment of the present invention, the main body of the structure, extended from one side of the structure is bent while being decreased in thickness so that vibration and noise can be effectively dampened in a small space.

In addition, the main body extended from one side of the structure is spirally bent while being decreased in thickness such that the length of the main body can be extended much longer, thereby optimizing vibration and noise damping effect in a small space.

DETAILED DESCRIPTION OF THE EMBODIMENTS

Figure 1:
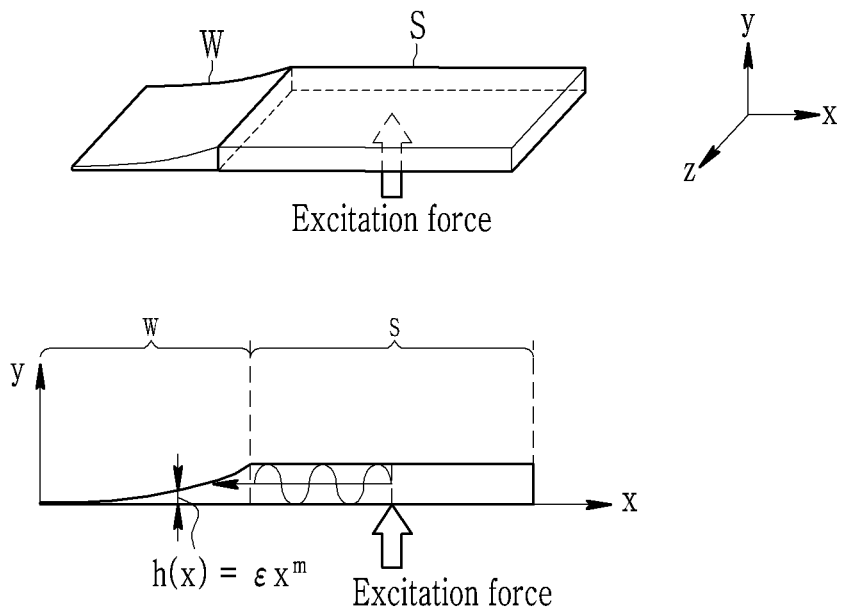
FIG. 1 is provided for description of a mechanism of vibration damping.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present invention is not limited thereto.

Throughout the present specification, when any one part is referred to as being "connected to" another part, it means that the one part and the other part are "directly connected to" each other or are "indirectly connected to" each other with another part interposed therebetween. In addition, unless explicitly described to the contrary, the word "comprise" and variations such as "comprises" or "comprising" will be understood to imply the inclusion of stated elements but not the exclusion of any other elements.

FIG. 1 is provided for description of a mechanism for damping of vibration.

Referring to FIG. 1, a wedge-type structure W (hereinafter referred to as a wedge structure) is connected to an edge of a beam or plate-type structure S (hereinafter-, referred to as a plate structure) such that the wedge structure W serves to dampen vibration of the plate structure S.

More specifically, when a excitation force is applied to the plate structure S, a bending wave in the plate structure moves toward the edge of the plate structure S, and when the wedge structure W of which a thickness is smoothly decreased is connected to the edge of the plate structure S, the bending wave moves toward the wedge structure W. In this case, as the wedge structure W is extended, the thickness is geometrically smoothly reduced, and when the thickness is reduced to zero, group velocity of the progressive bending wave is infinitely slowed so that the bending wave cannot reach an end of the wedge structure W. That is, a reflection wave theoretically cannot be generated in the plate structure S having the wedge structure S connected to the edge thereof, and accordingly, vibration of the plate structure S can be dampened.

In particular, in the lower figure of FIG. 1, theoretically, when the thickness is decreased to zero according to Equation 1 as the length of the wedge structure W is extended, group velocity of the progressive bending wave can be infinitely slowed.

$$h(x) = \varepsilon x^m \quad m \geq 2 \qquad \text{[Equation 1]}$$

(Herein, h(x) denotes a thickness, m denotes a positive real number, ε denotes a positive real number, and x denotes a distance from a tip of the wedge structure W.)

The bending wave is a wave generated from the plate structure S, and is one of elastic waves that progress while generating a displacement in a direction that is perpendicular to the progressing direction. Since the bending wave is a main cause of vibration generation in a thin structure such as a beam or a plate, it is important to control the bending wave in such a thin structure.

In order to enhance a vibration damping effect with respect to the plate structure S through the wedge structure W, the length of the wedge structure W needs to be extended, and the extension of the length of the wedge structure W causes a waste of space or difficulty in installation in a limited space. In addition, since it is impossible to process the thickness of the wedge structure W to be zero, the above-described method cannot be directly applied to control vibration in a product manufactured using a steel plate or beam, such as a vehicle, a plane, or a ship.

Hereinafter, various exemplary embodiments of the present invention to be described hereinafter use a vibration damping theory of the above-stated wedge structure W and can solve a problem of deterioration of spatial efficiency. That is, the exemplary embodiments of the present invention can effectively dampen vibration and noise generated from the vibration of the plate structure S by using only a small space. Hereinafter, although the effect for damping vibration is described in the following description, the effect not only includes damping of vibration but also includes damping of noise generated from the vibration. Thus, even if there is no special explanation, the vibration damping apparatus according to the exemplary embodiment of the present invention can provide not only a vibration damping effect but also a noise damping effect.

Meanwhile, the plate structure S to which the vibration damping apparatus according to the exemplary embodiment of the present invention is connected to dampen vibration includes a structure provided as a beam or plate, and also includes a structure of which one end is formed in the shape of a beam or a plate. Further, the plate structure S is an example of a structure to which the vibration damping apparatus according to the exemplary embodiment of the present invention is attached, and therefore, the structure is not limited to a case of being connected to the plate structure S. The vibration damping apparatus may be connected to various types of vibrating structures. However, for convenience of description, the vibration damping apparatus according to the exemplary embodiment of the present invention will be exemplarily described to be connected to the plate structure S.

The vibration damping apparatus according to the exemplary embodiment of the present invention extends from one side of a vibrating structure. For example, a main body of the vibration damping apparatus is connected to one side with a predetermined length, but as at least a part of the main body is extended, a thickness thereof is reduced and at least the part of the main body may be bent so as to reduce an occupied space. That is, when the extended part of the main body of the vibration damping apparatus has a decreasing thickness while being bent, the other part of the main body vibration damping apparatus may have a constant thickness or may have an increasing thickness, and may be extended in a straight line rather than being bent. The numerous variations are also included in the scope of the present invention. In this case, the vibration damping apparatus according to the exemplary embodiment of the present invention may be bent with a constant curvature or may be bent with a varying curvature in order to enhance a vibration damping effect in a small space. Hereinafter, various exemplary embodiments of the present invention will be described. In the drawings that illustrate exemplary embodiments to be described hereinafter, the entire body that form a vibration damping apparatus has a thickness that is gradually decreased and the main body is bent as the main body is being extended from a structure, but the present invention is not limited thereto. Instead of the entire main body, a part of the main body may be gradually decreased in thickness and bent as the main body is being extended from the structure and such a shape of the main body is also included in the scope of the present invention.

Figure 2:
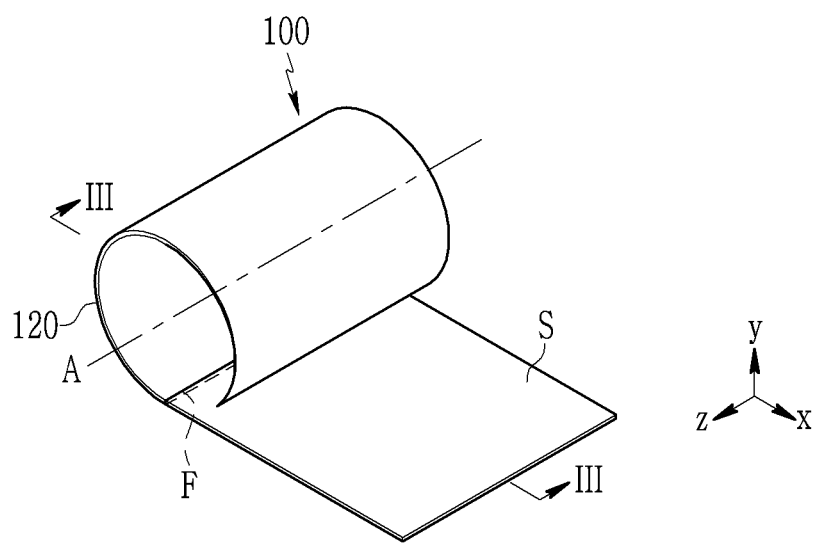
FIG. 2 is a perspective view of a vibration damping apparatus according to a first exemplary embodiment of the present invention.
Figure 3:
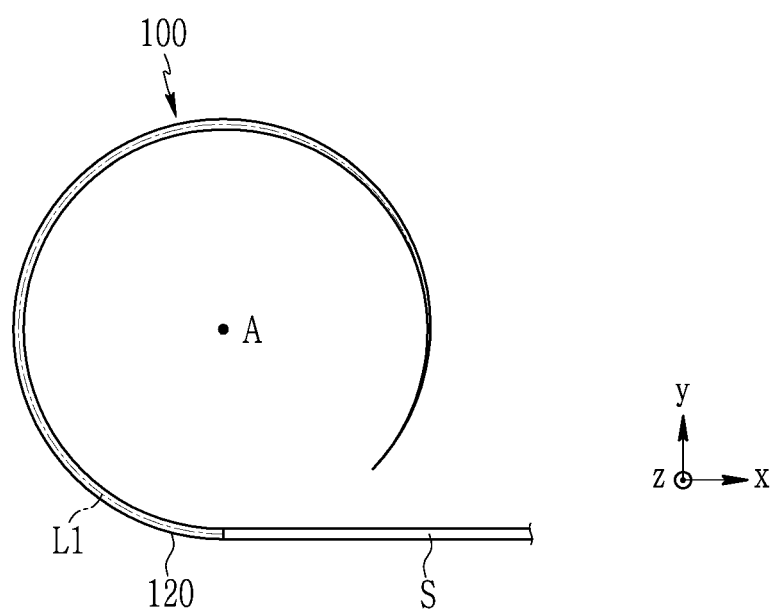
FIG. 3 is a cross-sectional view of FIG. 2, taken along the line III-III.

FIG. 2 is a perspective view of a vibration damping apparatus according to a first exemplary embodiment of the present invention, and FIG. 3 is a cross-sectional view of FIG. 2, taken along the line III-III.

Referring to FIG. 2 and FIG. 3, a vibration damping apparatus 100 according to the first exemplary embodiment of the present invention is connected to an edge of a plate structure S. Hereinafter, for better comprehension and ease of description, it will be exemplarily described that the plate structure S has a quadrangular shape, and the vibration damping apparatus 100 is connected to one edge of the plate substructure S. However, the vibration damping apparatus 100 may be connected to all edges rather than one edge, and may be connected to a curved edge of the plate structure S formed in the shape of a closed curved line.

The vibration damping apparatus 100 includes a main body 120 extended from the edge of the plate structure S.

The main body 20 is extended from an edge plane F of the plate structure S, and may be formed to be extended integrally with the plate structure S throughout the edge plane F of the plate structure S. However, although the main body 120 is extended integrally with the plate structure S, a width in a direction that is perpendicular to the extension direction of the main body 120 may be changed. That is, the main body 120 may be extended while maintaining a width of the main body 120 in the z-axis direction to be equal to a width of the plate structure S in the z-axis direction, but the width of the main body 120 in the z-axis direction may not be the same as the width of the plate structure S in the z-axis direction during the extension of the main body 120.

Further, the main body 120 may be made of the same material of the plate structure S, and for example, the plate structure S and the main body 120 may both be made of a steel material.

In this case, the main body 120 may be manufactured integrally with the plate structure S, and for example, the main body 120 may be formed by processing an edge portion of the plate structure S by using various methods such as forming, pressing, machining, 3D printing, and the like.

According to the exemplary embodiment of the present invention, one end of the main body 120 has the same thickness as of the edge plane F of the plate structure S, and the thickness of the one end of the main body may be reduced as the main body 120 is extended toward the other end of the main body 120. The term "one end" of the main body 120 implies a direction of the edge plane F of the plate structure S, and the term "the other end" of the main body 120 implies a tip direction that is away from the plate structure S.

In this case, the thickness of the main body 120 may be reduced as given in Equation 1. However, according to the exemplary embodiment of the present invention, the main body 120 is extended as long as a predetermined length, and the other end has a predetermined thickness.

Therefore, according to the exemplary embodiment of the present invention, the thickness of the main body 120 may be reduced while being extended from one end to the other as given in Equation 2.

$$h(x)=h_0+\varepsilon x^m, m \geq 2$$ [Equation 2]

(Herein, h(x) denotes a thickness of the main body 120, m denotes a positive real number, ε denotes a positive real number, x denotes a distance from the other end of the main body 120, and $h_0$ denotes a thickness of the main body 120 at the other end.)

In this case, a thickness $h_0$ at the other end of the main body 120 may be determined according to the length of the main body 120, and is substantially determined depending on a limit of thinness processing.

Resultantly, the vibration damping apparatus 100 according to the exemplary embodiment of the present invention has a shape formed by bending the wedge structure W of FIG. 1 upward or downward of the plate structure S.

Meanwhile, the y axis direction is defined to be an upper direction and the −y axis direction is defined to be a lower direction in FIG. 2, and hereinafter, the main body 120 will be exemplarily described to be bent to the upper portion of the plate structure S.

Referring to FIG. 2, the main body 120 according to the first exemplary embodiment of the present invention may be bent with a constant curvature with respect to an axis that is parallel with a plane of the one end that contacts the plate structure S. That is, the main body 120 may be bent with a constant curvature with respect to an axis A that is parallel with the edge plane F of the plate structure S. For example, a cross-section of the main body 120, cut into a plane that is perpendicular to the axis A, may have a shape of a circular arc. More specifically, referring to FIG. 3, an imaginary center line L1 that connects a center of the thickness of the main body 120 from the cross-section of the main body 120 may form an arc with respect to the axis A, and the other end of the main body 120 may be disposed apart from the plate structure S so as to not contact the plate structure S.

Accordingly, as the length of the main body 120 is increased, the curvature with which the main body 120 is bent is reduced and a space occupied by the main body 120 is increased.

Figure 4:
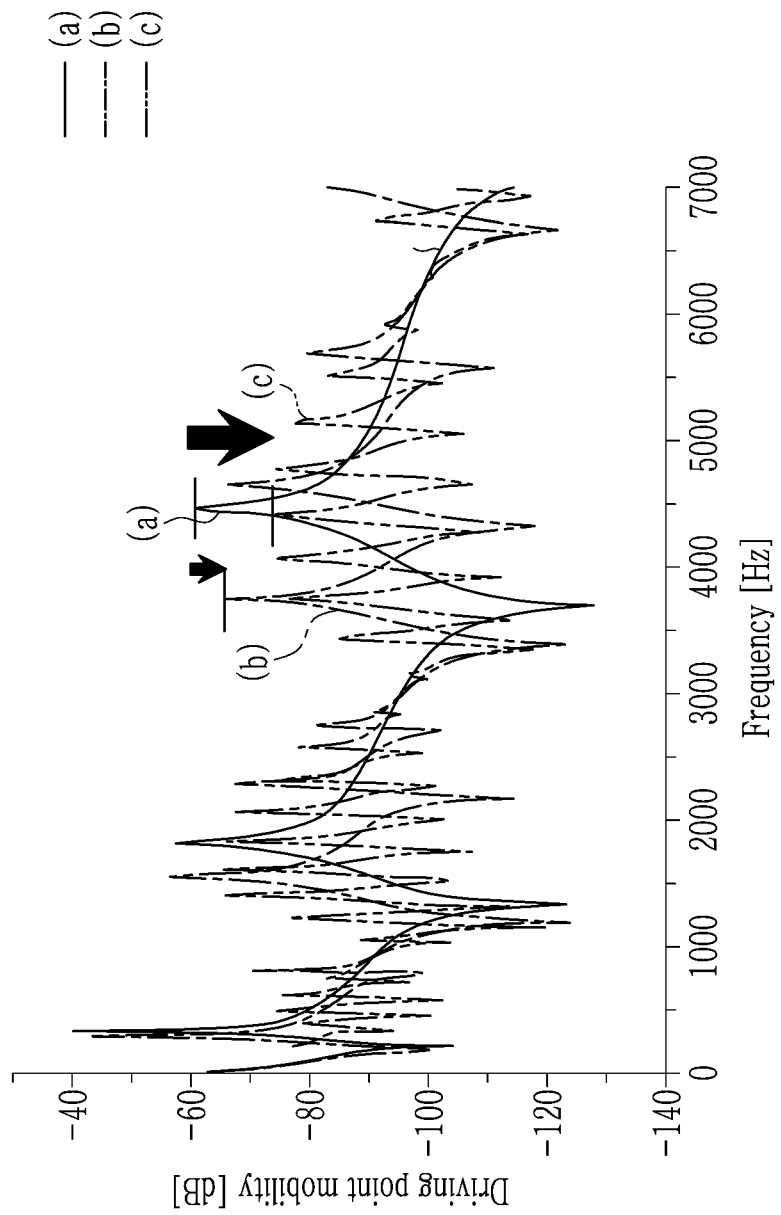
FIG. 4 is a graph that illustrates a vibration damping effect of the vibration damping apparatus according to the first exemplary embodiment of the present invention.

FIG. 4 is a graph that shows a vibration damping effect of the vibration damping apparatus according to the first exemplary embodiment of the present invention. FIG. 4 is a graph that shows vibration in a 280 mm*195 mm*5.04 mm steel plate structure. (a) is a case that nothing is connected to one edge plane (i.e., the 195 mm plane) of the steel plate structure, (b) is a case that a 45 mm-long arc shaped main body 120 is connected to the one edge plane, and (c) is a case that a 360 mm-long arc shaped main body 120 is connected to the one edge plane. In (b) and (c), a curvature of the arc-shaped main body 120 is 15.27 $m^{-1}$, and a curvature radius is about 65 mm.

Referring to FIG. 4, when the vibration damping apparatus 100 according to the first exemplary embodiment is applied, vibration can be better dampened, and it can be observed that the vibration damping effect is enhanced (marked by arrows) as the length of the main body 120 of the vibration damping apparatus 100 is increased. In addition, when the main body 120 is formed in the shape of an arc, the vibration damping effect can be enhanced by increasing the length of the main body 120 while using a space that is similar to a space of a straight line shaped main body.

Figure 5:
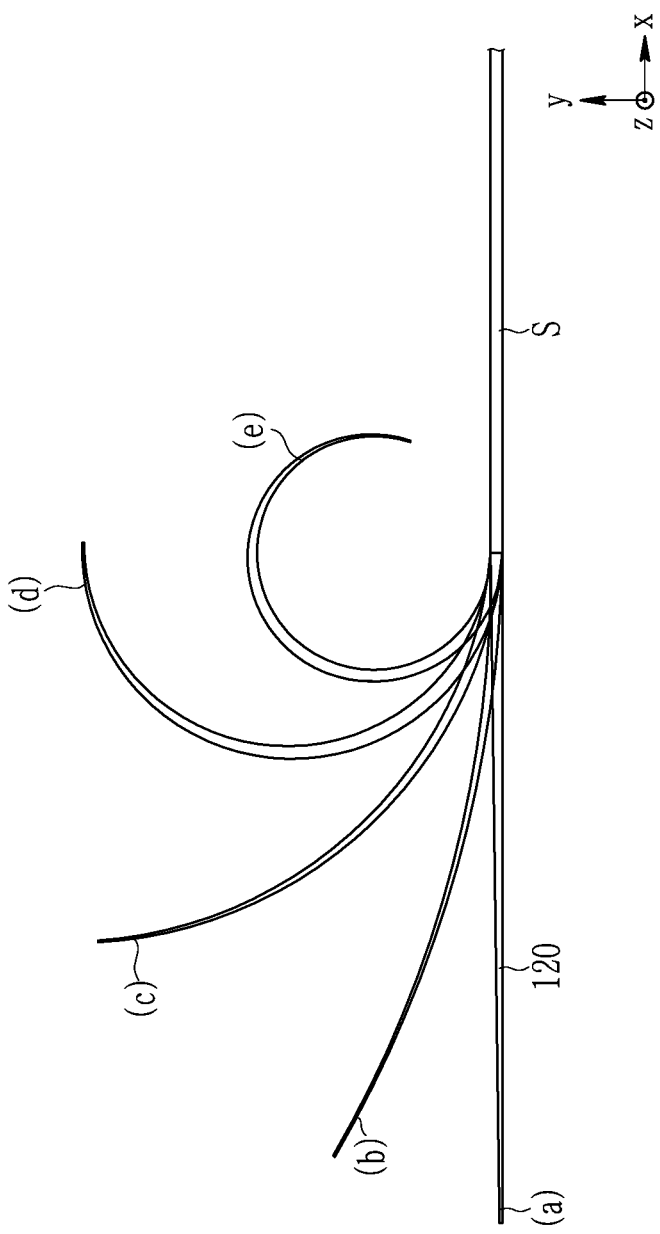
FIG. 5 is a cross-sectional view of various variations of the vibration damping apparatus according to the first exemplary embodiment of the present invention.
Figure 6:
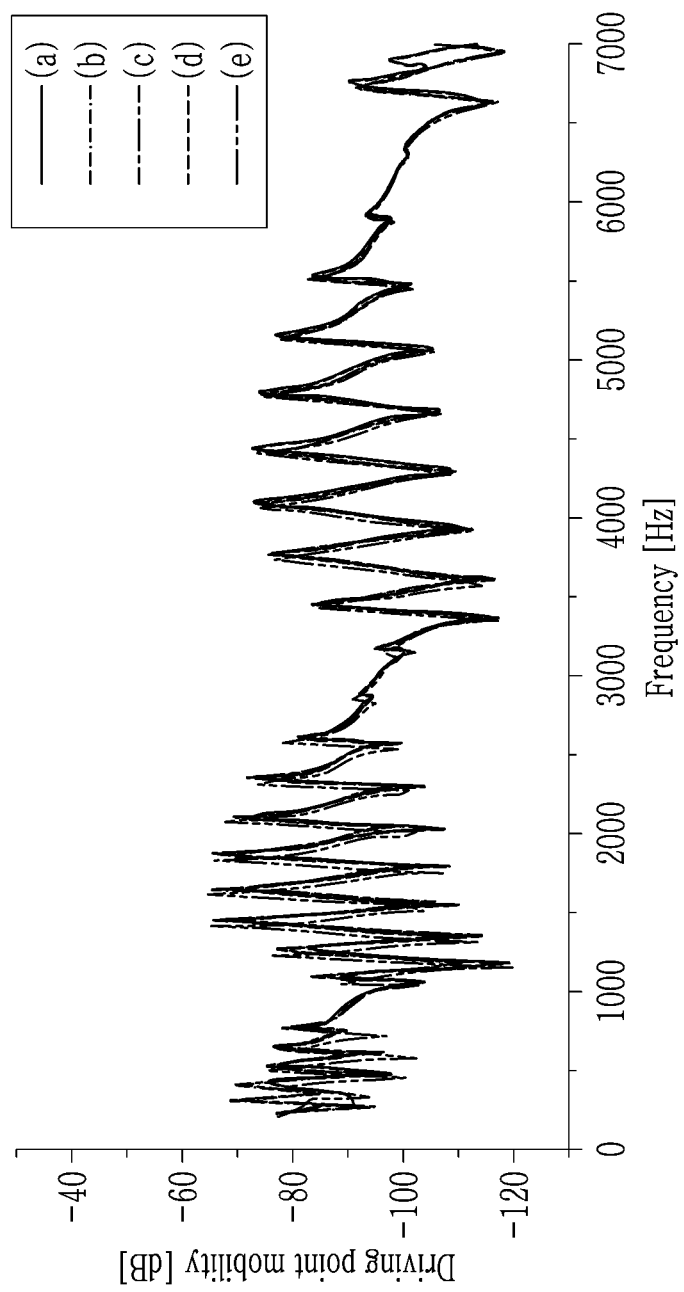
FIG. 6 is a graph that shows comparison of vibration damping effects according to the exemplary variations of FIG. 5.

FIG. 5 is a cross-sectional view of numerous variations of the vibration damping apparatus 100 according to the first exemplary embodiment of the present invention, and FIG. 6 is a graph of comparison of vibration damping effects according to the variations of FIG. 5.

In FIG. 5, when the length of the main body 120 is 360 mm, a curvature of (a) is 0 $m^{-1}$, a curvature of (b) is 1.45 $m^{-1}$, a curvature of (c) is 4.36 $m^{-1}$, a curvature of (d) is 8.73 $m^{-1}$, and a curvature of (e) is 15.27 $m^{-1}$. The curvature is gradually increased toward (e) from (a), and (a) is a case of a straight-lined main body having a curvature of 0 and is provided for comparison with (b) to (e). Referring to FIG. 5, it can be observed that as the curvature is increased, a space occupied by the main body 120 is decreased. That is, the space for the vibration damping apparatus can be reduced by shaping the length of the main body 120 to an arc from a straight line.

Referring to FIG. 6, when the main body 120 is bent with a constant curvature, a vibration damping effect of the vibration damping apparatus according to the first exemplary embodiment of the present invention is irrelevant to the size of curvature with which the main body 120 is bent unless the length of the main body 120 is different. That is, it can be determined that there is almost no difference in driving point mobility according to frequency between (a) to (e).

Meanwhile, since the main body 120 of the vibration damping apparatus 100 according to the first exemplary embodiment of the present invention is bent with a constant curvature, the other end of the main body 120 may contact the plate structure S with the length of the main body 120 that is further extended. When the other end of the main body 120 contacts the plate structure S, noise and damage may be generated due to contact impact, and accordingly there is a limit in extension of the length of the main body 120 in order to prevent the other end of the main body 120 from contacting the plate structure S. In addition, when the length of the main body 120 is extended to enhance the vibration damping effect, an increase of the space for the main body 120 is unavoidable in order to avoid the other end of the main body 120 from contacting the plate structure S.

Hereinafter, a second exemplary embodiment of the present will be described, and the second exemplary embodiment may solve such a drawback of the first exemplary embodiment. A description of a content that is the same as that of the above-described first exemplary embodiment will be omitted in the description of the second exemplary embodiment, and only a difference therebetween will be described in detail.

Figure 7:
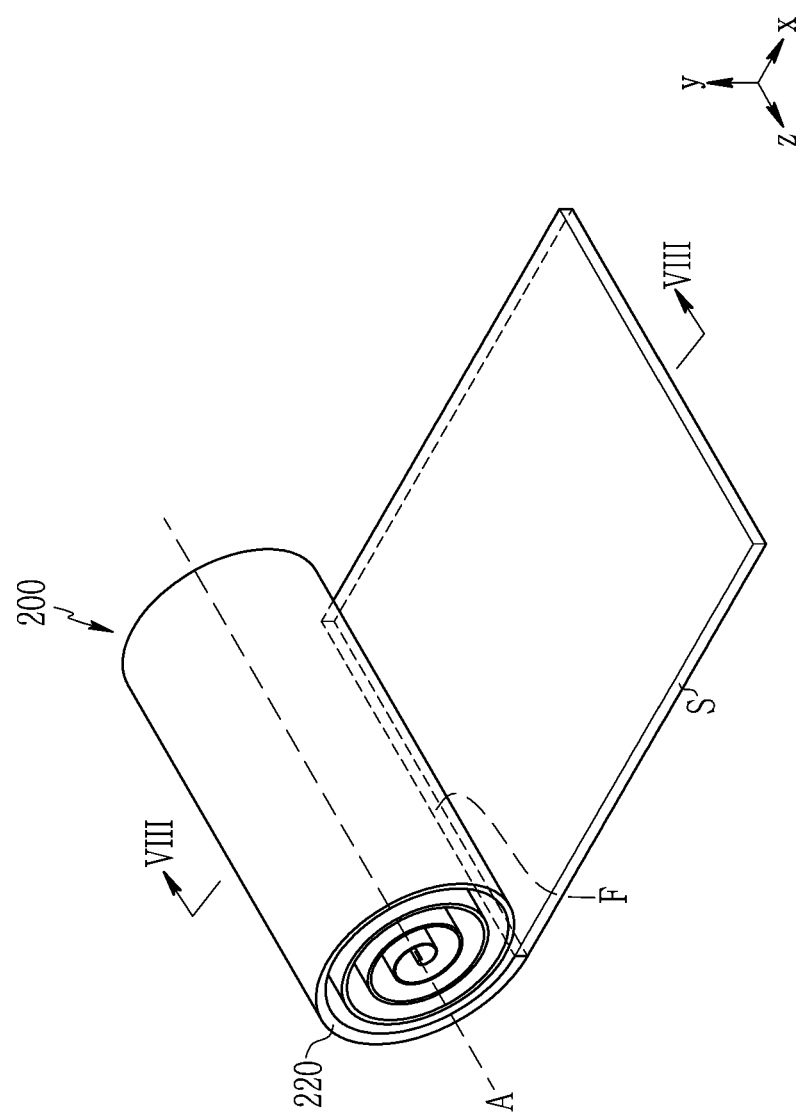
FIG. 7 is a perspective view of a vibration damping apparatus according to a second exemplary embodiment of the present invention.
Figure 8:
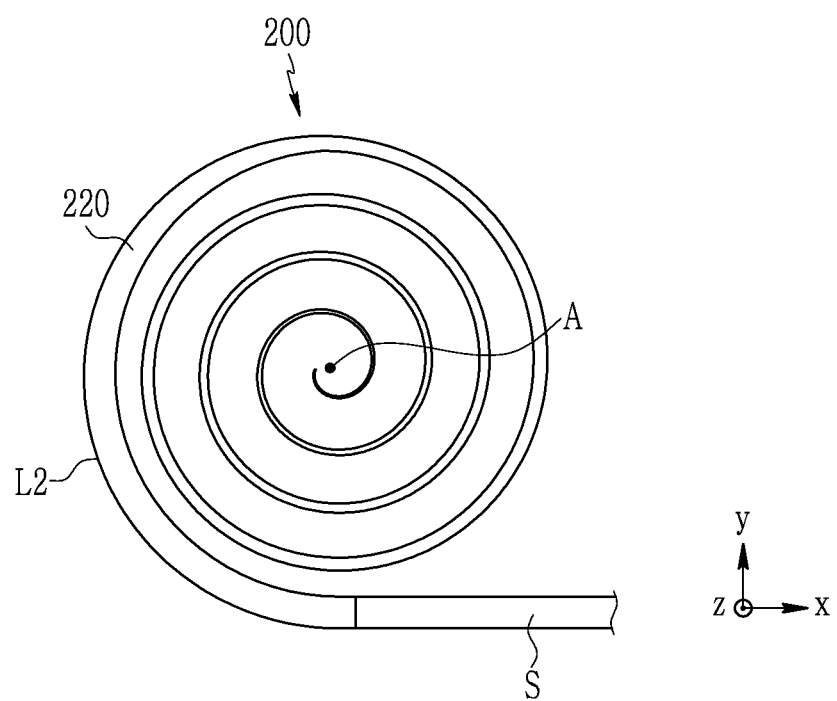
FIG. 8 is a cross-sectional view of FIG. 7, taken along the line VIII-VIII.

FIG. 7 is a perspective view of a vibration damping apparatus according to the second exemplary embodiment of the present invention, and FIG. 8 is a cross-sectional view of FIG. 7, taken along the line VIII-VIII.

Referring to FIG. 7 and FIG. 8, a main body 220 of a vibration damping apparatus 200 according to the second exemplary embodiment of the present invention extends from an edge plane F of a plate structure S, and may be extended integrally with the plate structure S through the edge plane F of the plate structure S.

One end of the main body 220 has the same thickness of the thickness of the edge plane F of the plate structure S, and the thickness of the main body 220 may be gradually decreased while being extended to the other end as given in Equation 2. Hereinafter, it will be exemplarily described that the main body 220 is bent over the top of the plate structure S.

According to the second exemplary embodiment of the present invention, the main body 220 may be bent with an irregular curvature with respect to an axis that is parallel with a plane of the end that contacts the plate structure S. That is, the main body 220 may be bent with an irregular curvature with respect to an axis A that is parallel with the edge plane F of the plate structure S. That is, the main body 220 may be bent with a varying curvature. For example, while being extended from one end to the other end, the main body 220 is bent with an increasing curvature, and accordingly, spatial efficiency can be optimized.

More specifically, referring to FIG. 8, a cross-section of the bent main body 220, cut into a plane that is perpendicular to the axis A, may have a spiral shape, and the other end of the main body 220 may be disposed at the center of the spiral so as to not be overlapped with other portion of the adjacent main body 220. Accordingly, since the main body 220 can be maximally extended in a small space without being overlapped, the maximum vibration damping effect can be acquired.

In the second exemplary embodiment of the present invention, as the length of the main body 220 is increased in the limited space, a gap the bent main body 220 is small such that a contact of the main body 220 may occur when vibration occurs. Thus, according to the second exemplary embodiment of the present invention, the spiral, which is the cross-sectional shape of the bent main body 220, may be an Archimedean spiral. Accordingly, the length of the main body 220 can be maximally extended in the limited space, thereby optimizing spatial efficiency.

Here, the Archimedean spiral is a spiral of which a distance measured radially out from the center is increased in proportion to a rotation angle, and when a straight line is drawn radially out from the center, a distance between cross points of the straight line and the spirals are constant. This is well known to the person in the art, and therefore no further detailed described will be provided.

For example, referring to FIG. 8, a line L2 along which the bottom side of the main body 220 is extended in the cross-section of the main body 220 may be provided as an Archimedean spiral. When the main body 220 vibrates, amplitude of the vibration is increased as the thickness is reduced, that is, closer to the center, and when the line L2 forms the Archimedean spiral, a contact problem between adjacent portions of the main body 220 due to the vibration can be most effectively prevented.

Figure 9:
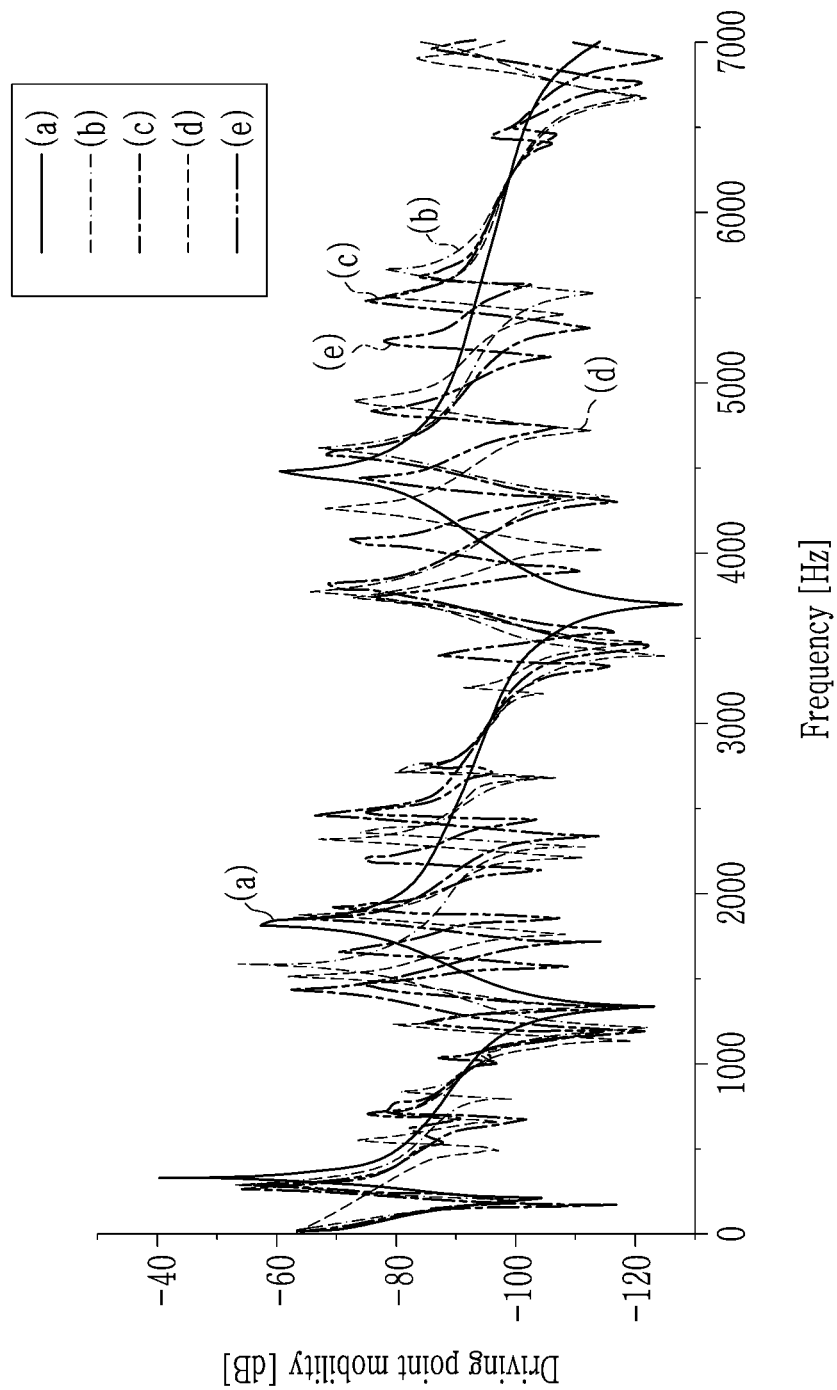
FIG. 9 is a graph that shows comparison of vibration damping effects according to a length of the vibration damping apparatus according to the second exemplary embodiment of the present invention.

FIG. 9 is a graph that illustrates a vibration damping effect according to a length of the vibration damping apparatus according to the second exemplary embodiment of the present invention.

In FIG. 9, (a) shows vibration of the plate structure S where nothing is installed, and (b) to (e) show vibration of the plate structure S with application of the vibration damping apparatus according to the second exemplary embodiment of the present invention. In (b) to (e), each main body 220 is provided as an Archimedean spiral, and a length of main body 220 of (b) is 45 mm, a length of main body 220 of (c) is 90 mm, a length of main body 220 of (d) is 180 mm, and a length of main body 220 of (e) is 360 mm. The length of the main body 220 is gradually increased from (b) to (e), and (a) is shown for comparison with (b) to (e). Referring to FIG. 9, when a cross-section of the main body 220 that is bent forms the Archimedean spiral, a vibration damping effect is enhanced as the length of the main body 220 is increased.

Meanwhile, as previously described, in the vibration damping apparatuses 100 and 200 according to the first and second exemplary embodiments of the present invention, a tip of each of the main bodies 120 and 220 cannot have a thickness of zero due to a spatial limit and a process limit. Accordingly, when a bending wave generated from the plate structure S is transmitted to the tip (i.e., the other end) of each of the main bodies 120 and 220, the vibration damping effect can be more enhanced if energy of the bending wave at the tip can be dissipated to the outside.

Thus, the vibration damping apparatus according to the exemplary embodiments of the present invention may include a damping material that dissipation vibration.

Figure 10:
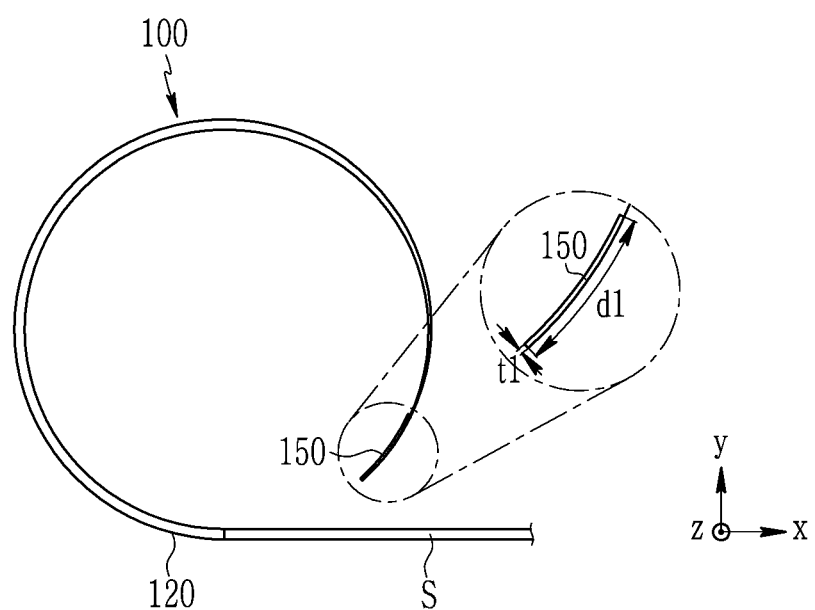
FIG. 10 is a cross-sectional view of the vibration damping apparatus according to the first exemplary embodiment of the present invention with application of a damping material.
Figure 11:
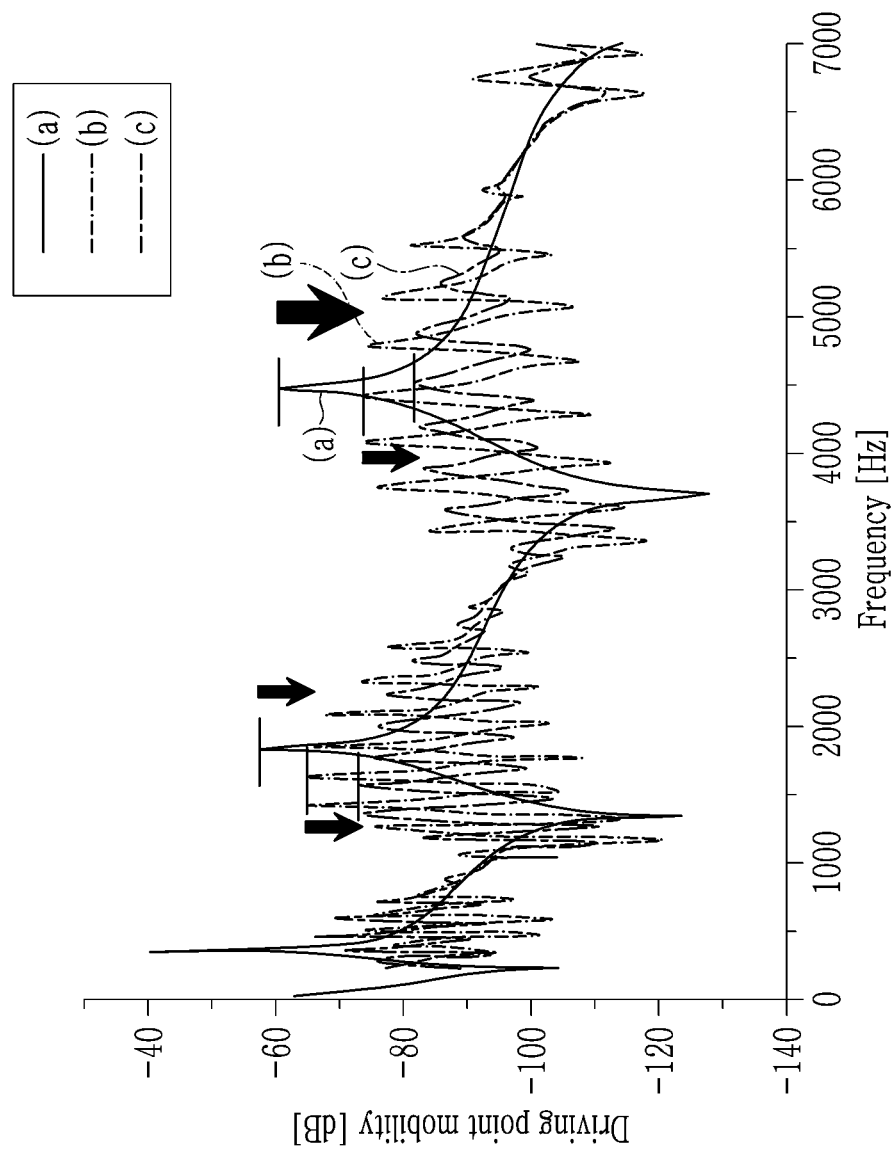
FIG. 11 is a graph that shows a vibration damping effect when the damping material is applied to the vibration damping apparatus according to the first exemplary embodiment of the present invention.

FIG. 10 is a cross-sectional view of the vibration damping apparatus of the first exemplary embodiment of the present invention with application of a damping material, and FIG. 11 is a graph that shows a vibration damping effect of the vibration damping apparatus of the first exemplary embodiment of the present invention with application of the damping material.

A damping material 150 is a material that dissipates vibration, and may be made of various materials such as a resin, epoxy, rubber, and the like, and referring to FIG. 10, the damping material 150 may be provided at the other end of the main body 120. In this case, the damping material 150 may be provided at one side, for example, a top side or a bottom side of the main body 120, using various methods such as attachment, bonding, coating, and the like.

Further, the damping material 150 is formed in the entire other end of the main body 120 along the z-axis direction in FIG. 10 so that a vibration damping effect can be enhanced.

In FIG. 11, (a) shows vibration of the plate structure S where nothing is installed, (b) shows vibration of the plate structure S where the vibration damping apparatus 100 having the main body 120 of which a cross-section is arc-shaped is provided at one edge thereof, and (c) shows vibration of the plate structure S where the vibration damping apparatus 100 having the main body 120 of which a cross-section is arc-shaped is provided at one edge thereof and a damping material 150 is provided at a tip of the main body 120 is provided. Referring to FIG. 11, when the damping material 150 is attached to the tip of the main body 120, a vibration damping effect is enhanced (marked by arrows).

The damping material 150 may have a predetermined length d1 and a predetermined thickness t1. In general, the vibration damping effect can be enhanced as the length and the thickness of a damping material attached to a vibrating plate structure are increased, but in the vibration damping apparatuses 100 and 200 according to the exemplary embodiments of the present invention, most vibration energy is collected (i.e., localization) into the tip of each of the vibration damping apparatuses 100 and 200, and accordingly, a sufficient vibration damping effect can be acquired by extending the main body 120 only over a predetermined length, for example, only 10% of the length of the main body 120, without unconditionally extending the predetermined distance d1 of the damping material 150. Accordingly, the vibration damping apparatuses 100 and 200 according to the first and second exemplary embodiments of the present invention can minimize the damping material 150 in size and weight. Meanwhile, when the thickness t1 of the damping material 150 exceeds a predetermined thickness, the weight of the damping material 150 may be unnecessarily increased while providing the same vibration damping effect, and therefore it is effective to acquire optimal damping performance by using a damping material 150 of a predetermined size or less. In (b) and (c) of FIG. 11, the length of the main body 120 having an arc-shaped cross-section is 360 mm, the length d1 of the damping material 150 attached to one side of a tip of the main body 120 is d1, and the thickness t1 is 1, and a result of an experiment of a case that the damping material 150 is entirely attached along the z-axis of FIG. 10 is shown.

Figure 12:
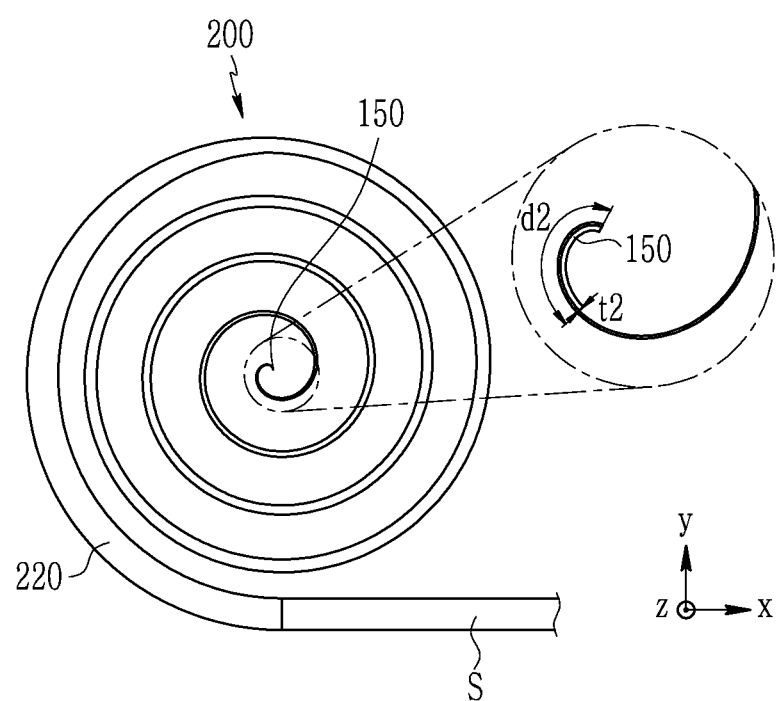
FIG. 12 is a cross-sectional view of the vibration damping apparatus according to the second exemplary embodiment of the present invention with application of a damping material.
Figure 13:
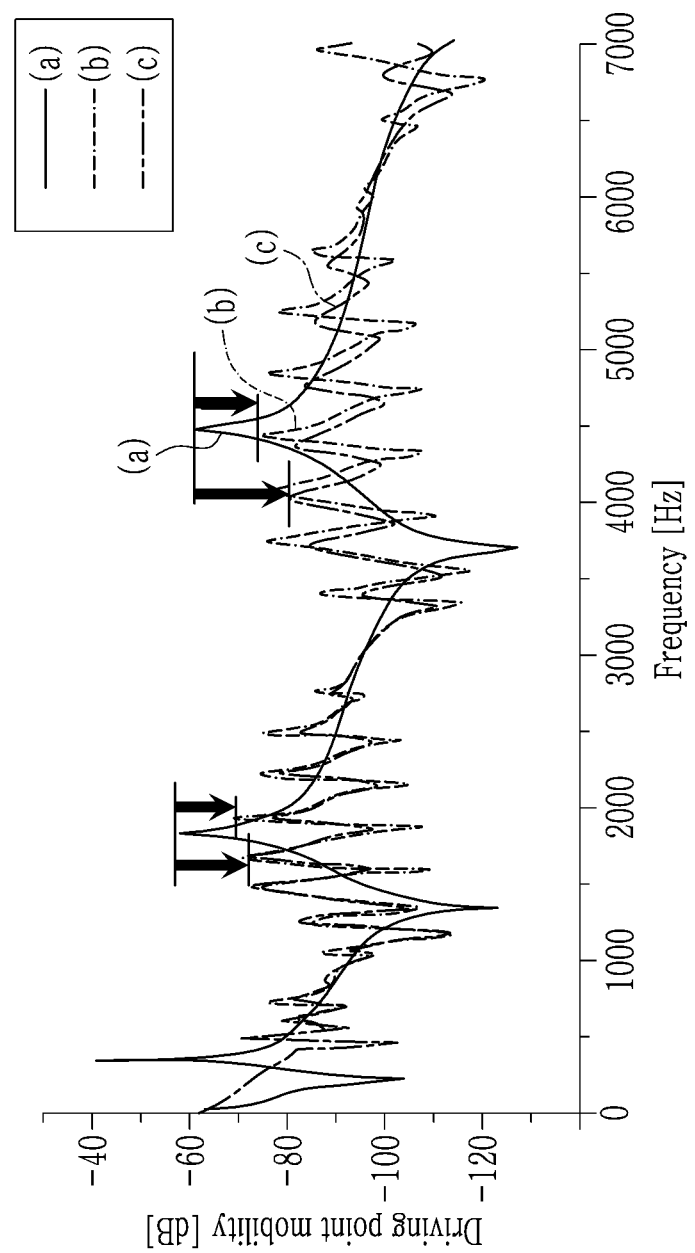
FIG. 13 is a graph that shows a vibration damping effect when the damping material is applied to the vibration damping apparatus according to the second exemplary embodiment of the present invention.

FIG. 12 is a cross-sectional view of the vibration damping apparatus according to the exemplary embodiment of the present invention with application of the damping material, and FIG. 13 is a graph that illustrates a vibration damping effect in the case of application of the damping material to the vibration damping apparatus according to the second exemplary embodiment of the present invention.

Referring to FIG. 12, the damping material 150 may be provided in the other end of the main body 220, more specifically, at the top side or the bottom side of the other end of the main body 220, using various methods such as attachment, bonding, coating, and the like.

In addition, the damping material 150 is formed in the entire other end or a part of the other end of the main body 220 along the z-axis direction of FIG. 12 such that a vibration damping effect can be enhanced.

In FIG. 13, (a) shows vibration in the plate structure S where nothing is installed, (b) shows vibration in the plate structure S where the vibration damping apparatus of which the main body 220 has a spiral (i.e., Archimedean spiral) cross-section provided at one edge, and (c) shows vibration in the plate structure S where the vibration damping apparatus 20 of which the damping material 150 is attached to one side of a tip of the main body 220 is provided. In addition, in (b) and (c), a length of the main body 220 of which the main body 220 having the spiral (Archimedean spiral) cross-section is 360 mm, a length d2 of the damping material 150 attached to the tip of the main body 220 is 30 mm, and a thickness t2 is 1 mm, and a result of an experiment of a case that the damping material 150 is entirely attached along the z-axis of FIG. 12 is shown. Referring to FIG. 13, when the damping material 150 having a predetermined length and predetermined thickness which are included in a volume range that affects the vibration damping effect is attached to the tip of the main body 220, the vibration damping effect is increased (marked by the arrows).

As described above, according to the exemplary embodiments of the present invention, the main body extended from an edge of a beam- or plate-shaped structure is bent while forming an arc shape such that vibration can be effective dampened in a small space. In addition, the main body extended from the edge is spirally bent such that the length of the main body can be extended longer, thereby optimizing spatial efficiency. Further, the damping material is attached to the tip of the main body so that the vibration damping effect can be further enhanced.

Exemplary embodiments of the present invention are disclosed herein, but the present invention is not limited to the disclosed embodiments, and, to the contrary, are intended to cover various modifications and equivalent arrangements included within the appended claims and the detailed description and the accompanying drawings of the present invention.

DESCRIPTION OF SYMBOLS 100, 200 vibration damping apparatus
120, 220 main body
150 damping material

What is claimed is:

1. A vibration damping apparatus for damping vibration of a vibrating structure, the apparatus comprising a main body extended from an edge plane of the structure with a predetermined length from one end that contacts the edge plane to the other end,
   wherein at least a part of the main body is bent with a gradually decreasing thickness from the one end to the other end of the main body,
   wherein the one end of the main body has the same thickness as the edge plane, and is extended integrally with an edge of the structure,
   wherein the thickness of the main body is gradually decreased from the one end to the other end as given in Equation 1:

$$h(x) = h_0 + \varepsilon x^m, m \geq 2$$ [Equation 1]

wherein h(x) denotes a thickness of the main body, m denotes a positive real number, ε denotes a positive real number, x denotes a distance from the other end of the main body, and $h_0$ denotes a thickness of the main body at the other end.

2. The vibration damping apparatus of claim 1, wherein the at least a part of the main body is bent with a constant curvature.

3. The vibration damping apparatus of claim 2, wherein the at least a part of the main body is bent with a constant curvature with respect to an axis that is parallel with a plane of the one end of the main body, contacting the structure.

4. The vibration damping apparatus of claim 3, wherein a cross-section of the at least a part of the main body, cut along a plane that is perpendicular to the axis, has an arc shape.

5. The vibration damping apparatus of claim 1, wherein the at least a part of the main body is bent with a varying curvature.

6. The vibration damping apparatus of claim 5, wherein the at least a part of the main body is bent with a varying curvature with respect to an axis that is parallel with a plane of the one end of the main body, contacting the structure.

7. The vibration damping apparatus of claim 6, wherein the at least a part of the main body is bent with a curvature that is gradually increased while being extended in a direction of the other end of the main body.

8. The vibration damping apparatus of claim 7, wherein a cross-section of the at least a part of the main body, cut into a plane that is perpendicular to the axis, has a spiral shape.

9. The vibration damping apparatus of claim 8, wherein the spiral shape is an Archimedean spiral.

10. The vibration damping apparatus of claim 9, wherein a line along which one side of the main body is extended is formed of the Archimedean spiral in the cross-section of the at least a part of the main body.

11. The vibration damping apparatus of claim 1, wherein the main body is extended integrally with the structure throughout the edge plane of the structure.

12. The vibration damping apparatus of claim 1, wherein the other end of the main body is disposed apart from the structure.

13. The vibration damping apparatus of claim 1, further comprising a damping material attached to the at least a part of the main body.

14. The vibration damping apparatus of claim 13, wherein the damping material is attached to the other end of the main body.

15. The vibration damping apparatus of claim 1, wherein the main body is made of the same material as the structure.

* * * * *